(12) United States Patent
Lee et al.

(10) Patent No.: US 10,761,671 B2
(45) Date of Patent: Sep. 1, 2020

(54) DIGITIZER AND METHOD OF MANUFACTURING THE SAME

(71) Applicant: Samsung Electronics Co., Ltd., Gyeonggi-do (KR)

(72) Inventors: Joo-Hoon Lee, Gyeonggi-do (KR); Sung-Ha Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/297,886

(22) Filed: Mar. 11, 2019

(65) Prior Publication Data

US 2019/0204962 A1 Jul. 4, 2019

Related U.S. Application Data

(63) Continuation of application No. 14/198,820, filed on Mar. 6, 2014, now abandoned.

(30) Foreign Application Priority Data

Mar. 14, 2013 (KR) .................. 10-2013-0027342

(51) Int. Cl.
*G06F 3/046* (2006.01)

(52) U.S. Cl.
CPC .... *G06F 3/046* (2013.01); *G06F 2203/04103* (2013.01); *Y10T 29/49124* (2015.01)

(58) Field of Classification Search
CPC ........... G06F 3/046; G06F 2203/04103; Y10T 29/49124
See application file for complete search history.

(56) References Cited

U.S. PATENT DOCUMENTS

| | | | |
|---|---|---|---|
| 3,512,946 A | 5/1970 | Hutkin | |
| 4,459,248 A | 7/1984 | Sagawa et al. | |
| 4,631,820 A | 12/1986 | Harada et al. | |
| 4,988,837 A | 1/1991 | Murakami et al. | |
| 5,186,985 A | 2/1993 | Estes et al. | |
| 5,444,190 A | 8/1995 | Yamanami et al. | |
| 5,473,110 A | 12/1995 | Johnson | |
| 5,892,497 A | 4/1999 | Robertson | |
| 5,925,455 A | 7/1999 | Bruzzone et al. | |
| 6,021,296 A | 2/2000 | Tamura et al. | |
| 6,048,601 A | 4/2000 | Yahagi et al. | |
| 6,285,284 B1 | 9/2001 | Soe et al. | |

(Continued)

FOREIGN PATENT DOCUMENTS

| | | |
|---|---|---|
| JP | 6-111302 A | 4/1994 |
| JP | 2006-93414 A | 4/2006 |

(Continued)

OTHER PUBLICATIONS

Korean Search Report dated Apr. 23, 2019.

*Primary Examiner* — Sejoon Ahn
(74) *Attorney, Agent, or Firm* — Cha & Reiter, LLC

(57) ABSTRACT

A method of manufacturing a digitizer includes forming a circuit layer that detects an input, forming a magnetic field shielding layer that contains disoriented magnetic powder, disposing an adhesive between the circuit layer and the magnetic field shielding layer, and hot pressing the circuit layer and the magnetic field shielding layer so as to orient the magnetic powder.

11 Claims, 10 Drawing Sheets

(56) References Cited

U.S. PATENT DOCUMENTS

| | | |
|---|---|---|
| 6,765,279 B2 | 7/2004 | Leedy |
| 8,268,092 B2 | 9/2012 | Yang et al. |
| 9,001,088 B2 | 4/2015 | Lee et al. |
| 9,052,785 B2 * | 6/2015 | Horie .................. G06F 3/03545 |
| 9,392,735 B2 | 7/2016 | Jang et al. |
| 9,507,390 B2 | 11/2016 | Jang et al. |
| 9,578,792 B2 | 2/2017 | Jang et al. |
| 2002/0076511 A1 * | 6/2002 | Sanada ............ G06K 19/06046 428/1.1 |
| 2003/0082846 A1 * | 5/2003 | Yoneda .............. H01L 21/6835 438/106 |
| 2003/0170571 A1 * | 9/2003 | Nozaki ................ G03F 7/0035 430/314 |
| 2004/0099650 A1 | 5/2004 | Imai et al. |
| 2006/0023131 A1 | 2/2006 | Takano et al. |
| 2006/0099403 A1 | 5/2006 | Johnson |
| 2006/0121256 A1 | 6/2006 | Kim et al. |
| 2008/0002460 A1 | 1/2008 | Tuckerman et al. |
| 2008/0122047 A1 | 5/2008 | Honer et al. |
| 2009/0002117 A1 | 1/2009 | Kawarai |
| 2009/0008142 A1 | 1/2009 | Shimizu et al. |
| 2009/0121560 A1 | 5/2009 | Edelson et al. |
| 2010/0027927 A1 | 2/2010 | Koyagi et al. |
| 2010/0195033 A1 | 8/2010 | Takayama et al. |
| 2010/0288418 A1 | 11/2010 | Yang et al. |
| 2012/0025355 A1 | 2/2012 | Sasaki et al. |
| 2012/0127578 A1 | 5/2012 | Bright et al. |
| 2012/0268402 A1 * | 10/2012 | Wang ..................... G06F 3/041 345/173 |
| 2013/0016073 A1 | 1/2013 | Lee et al. |
| 2013/0082591 A1 | 4/2013 | Seo et al. |
| 2013/0120098 A1 | 5/2013 | Chatani et al. |
| 2013/0188103 A1 | 7/2013 | Jeng |
| 2013/0202848 A1 | 8/2013 | Kim et al. |
| 2013/0293792 A1 | 11/2013 | You et al. |
| 2013/0320467 A1 | 12/2013 | Buchanan et al. |
| 2013/0321719 A1 | 12/2013 | Sumida et al. |
| 2014/0151662 A1 * | 6/2014 | Inoue .................. H01L 51/0085 257/40 |
| 2014/0175413 A1 | 6/2014 | Inoue et al. |
| 2014/0362505 A1 | 12/2014 | Jang et al. |
| 2015/0124402 A1 | 5/2015 | Jang et al. |
| 2015/0212651 A1 | 7/2015 | Lee et al. |
| 2016/0105969 A1 | 4/2016 | Habu et al. |

FOREIGN PATENT DOCUMENTS

| | | |
|---|---|---|
| JP | 2011-100379 A | 5/2011 |
| KR | 10-2009-0099807 A | 9/2009 |
| KR | 10-2012-0025182 A | 3/2012 |
| KR | 10-2012-0041238 A | 4/2012 |
| KR | 10-2013-0007954 A | 1/2013 |

* cited by examiner

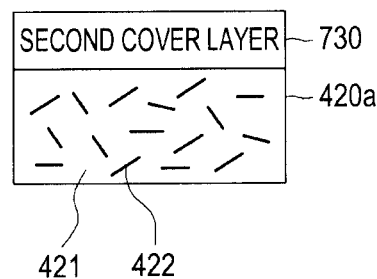
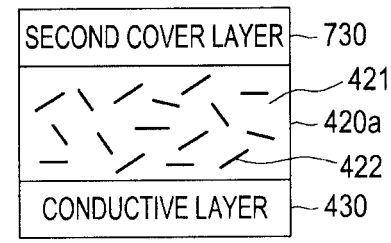
FIG.13A  FIG.13B
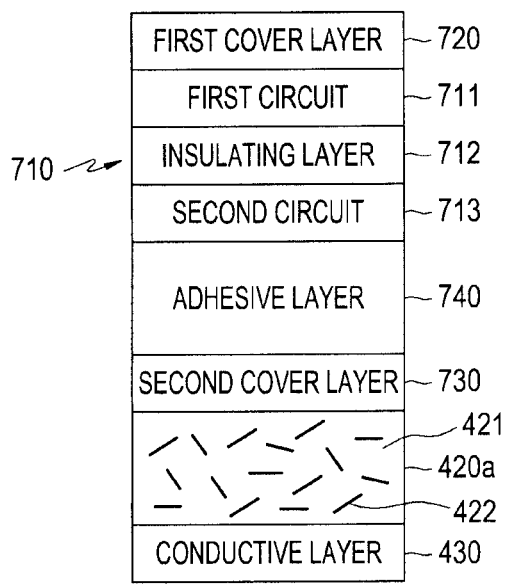
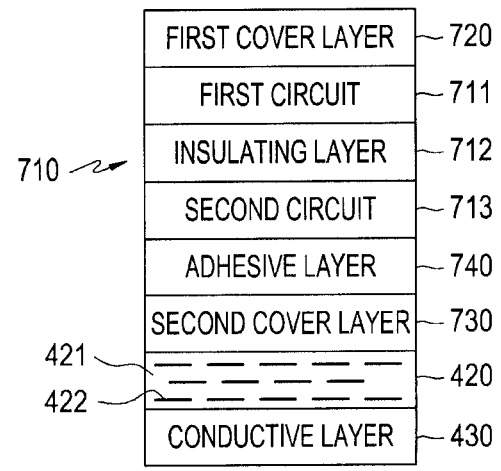
FIG.14A  FIG.14B

DIGITIZER AND METHOD OF MANUFACTURING THE SAME

CLAIM OF PRIORITY

This application is a Continuation of U.S. patent application Ser. No. 14/198,820 filed on Mar. 6, 2014 which claims priority under 35 U.S.C. § 119(a) to Korean Application Serial No. 10-2013-0027342, which was filed in the Korean Intellectual Property Office on Mar. 14, 2013, the entire contents of which are incorporated herein by reference.

BACKGROUND

1. Technical Field

The present disclosure relates generally to a digitizer, and more particularly, to a digitizer having a magnetic field shield layer and a method of manufacturing the same.

2. Description of the Related Art

In recent years, markets related to smart phones or touch screens have been rapidly growing. Touch screens are widely used as input devices for mobile terminals. Capacitive touch screens having a transparent electrode and adapted to measure a change in an electrostatic capacity generated by applied pressure from a touch are often used. However, the capacitive touch screen requires a user to contact the touch screen and apply a predetermined pressure or displacement. The touch screen does not accept inputs from a stylus or a pen. In order to overcome the foregoing shortcomings, a touch screen technology using electromagnetic waves has been introduced This technology uses an Electromagnetic (EM) pointing input unit and a display screen.

An electronic device equipped with an EM pointing input unit requires a mounting mechanism to mount the unit to the electronic device. Many electronic devices include batteries and circuitry, both of which have the potential to disturb the electromagnetic fields used by the EM pointing input unit.

Definitions: in this document, when a layer or member is said to be formed or disposed 'on' another layer or member, the word "on" is used from the perspective of a fabrication process and thus may be interpreted as "on a top surface" or "on a bottom surface" of the relevant layer as, for example, either "atop" or "underneath".

SUMMARY

An aspect of the present disclosures to provide a digitizer which reduces or eliminates interference caused by stray electromagnetic fields from circuit components, batteries, and conductors.

Another aspect of the present disclosure is to provide a digitizer which has a thin mechanical structure and is simple to manufacture.

In accordance with another aspect of the present disclosure, a method of manufacturing a digitizer includes: forming a circuit layer that detects an input; forming a magnetic field shielding layer that contains disoriented magnetic powder; disposing an adhesive between the circuit layer and the magnetic field shielding layer, and hot pressing the circuit layer and the magnetic field shielding layer so as to orient the magnetic powder.

In accordance with another aspect of the present disclosure, a digitizer includes: a circuit layer that detects an input; a magnetic field shielding layer disposed on the circuit layer and containing oriented magnetic field powder; and a conductive layer disposed on the magnetic field shielding layer.

BRIEF DESCRIPTION OF THE DRAWINGS

The above and other aspects, features, and advantages of the present invention will be more apparent from the following detailed description taken in conjunction with the accompanying drawings, in which:

FIG. 12A, FIG. 12B, FIG. 13A, FIG. 13B, FIG. 14A and FIG. 14B are views which illustrate methods of manufacturing a digitizer according to the second set of exemplary embodiments of the present invention.

Throughout the drawings, the same or like drawing reference numerals will be understood to refer to the same or like elements, features, and structures.

DETAILED DESCRIPTION

The present invention may be variously modified and have various embodiments, so specific embodiments of the present invention will be described in detail with reference to the accompanying drawings. However, it should be understood that the present invention is not limited to the specific embodiments described herein and also includes all modifications, equivalents, and replacements which fall within the scope of the present invention.

Terms including ordinal numbers, such as first and second, may be used to describe various constituent elements, but the elements are not limited by these terms. The terms are used only to distinguish one element from other elements. For example, a first element may be named a second element without departing from the scope of the present invention, and a second element may be named a first element similarly. The term and/or includes a combination of a plurality of items or any one of a plurality of items.

The terms used herein are only used to describe specific embodiments and are not intended to limit the present invention. A singular expression includes a plural expression, unless the expression is explicitly defined differently in a given context. In addition, since terms, such as "including," "comprising," and "having" mean that one or more corresponding components may exist unless they are specifically described to the contrary, it shall be construed that one or more other components or additional components may be included.

All words comprising one or more technical or scientific terms have the same meanings that persons skilled in the art understand ordinarily, unless these words are explicitly defined otherwise. A word ordinarily used as defined in a dictionary shall be construed as if the word has a meaning equal to that in the context of a related description, and shall not be construed in an ideal or excessively formal meaning unless it is clearly defined as such in the present specification.

In the present invention, the term "laminated" may be replaced by the term "disposed".

In the present invention, a terminal may be an arbitrary device including a touch screen, and may be referred to as a portable terminal, a mobile terminal, a communication terminal, a portable communication terminal, or a portable mobile terminal.

For example, the terminal may be a smart phone, a mobile phone, a gaming device, a TV, a display device, a vehicular head unit, a notebook computer, a laptop computer, a tablet computer, a Personal Multimedia Player (PMP), or a Personal Digital Assistant (PDA). The terminal may be realized as a pocket-sized portable communication terminal having a wireless communication function. The terminal may be a flexible device or a flexible display device.

A representative configuration of the terminal relates to a mobile phone, and some constituent elements of the terminal may be omitted or modified if necessary.

Figure 1:
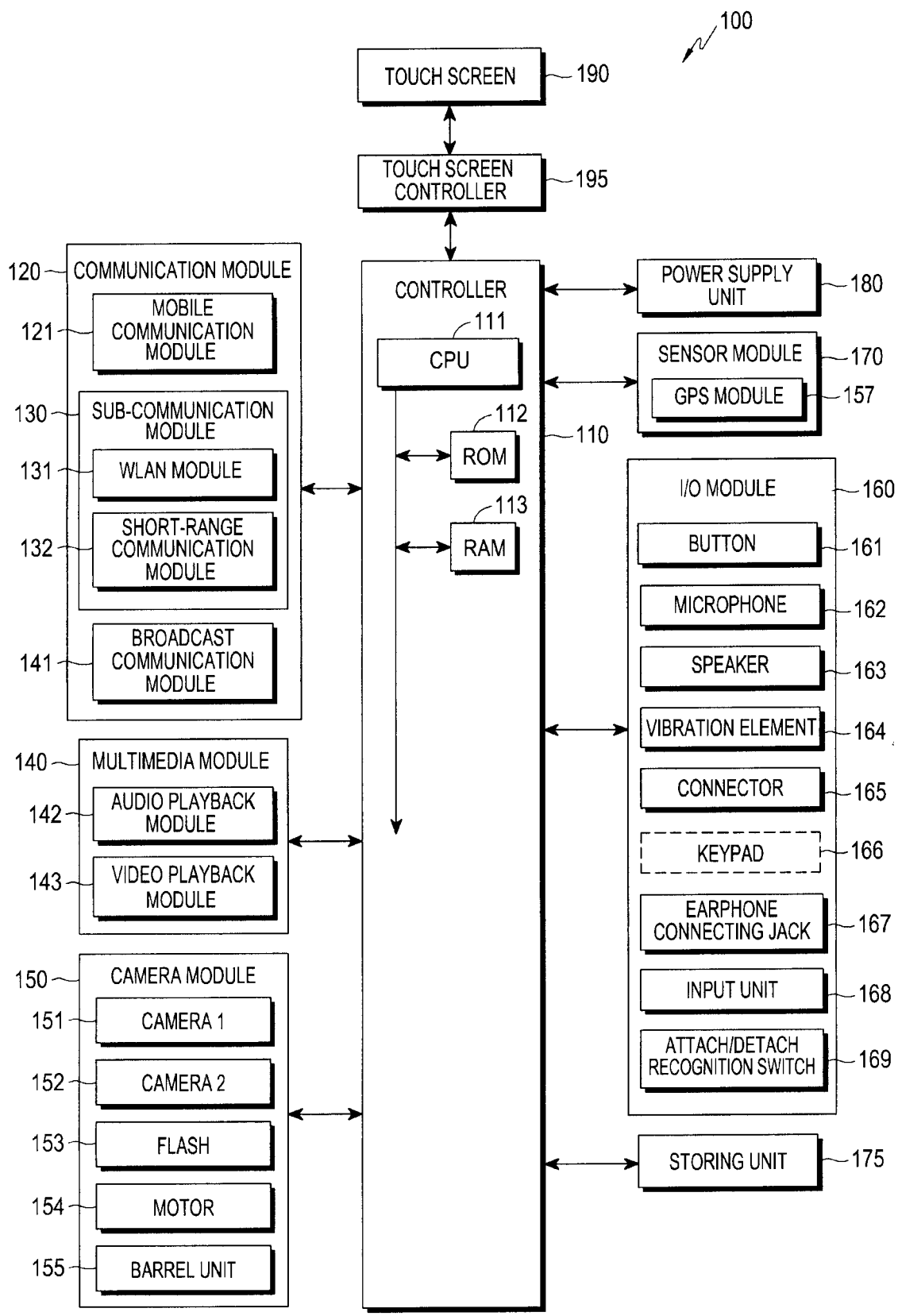
FIG. 1 is a functional block diagram showing a portable terminal according to a set of exemplary embodiments of the present invention.

FIG. 1 is a functional block diagram showing a portable terminal according to a set of exemplary embodiments of the present invention.

Referring to FIG. 1, the portable terminal 100 may be operatively coupled to an external electronic device (not shown) by using at least one of a communication module 120, a connector 165, or an earphone connection jack 167. The portable terminal 100 may, but need not, include any of various devices such as an earphone attached to the portable terminal 100 to be operatively coupled to the portable terminal 100, an external speaker, a Universal Serial Bus (USB) memory, a battery charger, a cradle/dock, an Advanced Television Systems Committee-Mobile/Handheld (ATSC-M/H) antenna, a Digital Media Broadcasting (DMB) antenna, a mobile payment related device, a heath management device (for example, a blood-sugar tester), a gaming device, or a vehicular navigation device. Further, the electronic device may include a wirelessly-accessible Bluetooth communication device, a Near Field Communication (NFC) device, a WiFi direct communication device, or a Wireless Access Point (WAP). The portable terminal 100 may be connected to one of another portable terminal or an electronic device, for example, a mobile phone, a smart phone, a table PC, a desktop PC, and a server by using wired or wireless communications.

Referring to FIG. 1, the portable terminal 100 includes at least one touch screen 190 and at least one touch screen controller 195. The portable terminal 100 includes a controller 110, a communication module 120, a multimedia module 140, a camera module 150, an input/output module 160, a sensor module 170, a storage unit 175, and a power supply 180.

The communication module 120 includes a mobile communication module 121, a sub-communication module 130, and a broadcast communication module 141.

The sub-communication module 130 includes at least one of a wireless local area network (WLAN) module 131 or a short-range communication module 132, and the multimedia module 140 includes at least one of an audio playback module 142 or a video playback module 143. The camera module 150 includes at least one of a first camera 151 or a second camera 152. The camera module 150 may include at least one of a barrel unit 155 for zooming in/out of a first and/or a second camera 151 and 152, a motor 154 for controlling zoom in/out movements of the barrel unit 155, and a flash 153 for providing a light source for photographing. The input/output (I/O) module 160 includes at least one of button 161, a microphone 162, a speaker 163, a vibration element 164, a connector 165, or an optional keypad 166.

The controller 110 may include a central processing unit (CPU) 111, a read-only memory (ROM) 112 that stores a control program for controlling the portable terminal 100, and a random-access memory (RANI) 113 that stores signals or data input from the outside of the portable terminal 100 or is used as a memory area for operations of the portable terminal 100. The CPU 111 may include a single core, a dual core, a triple core, or a quad core. The CPU 111, the ROM 112, and the RAM 113 may be operatively coupled to each other through an internal bus.

The controller 110 may control the communication module 120, the multimedia module 140, the camera module 150, the input/output module 160, the sensor module 170, the storage unit 175, the power supply 180, the touch screen 190, and the touch screen controller 195.

The controller 110 detects a user input applied to the touch screen 190. The user input may be applied using an input unit 168 such as a pen or a stylus. Alternatively or additionally, the applied input may be in the form of a finger of a user touching an object displayed on the touch screen 190, the finger of the user approaching an object displayed on the touch screen 109, or the finger of the user being in closer proximity to a first object displayed on the touch screen relative to a plurality of other displayed objects. The controller 110 identifies an object corresponding to a location on the touch screen 190 where a user input is applied. The user input through the touch screen 190 includes any of a direct touch input by which an object is directly touched, and a hovering input which is an indirect touch input by which an object is not directly touched, but rather the object is approached within a preset recognizable distance. For example, if the input unit 168 is located close to and above the touch screen 190, an object located below the input unit 168 on the touch screen 190 may be selected. In the present invention, the user input includes, in addition to a user input through the touch screen 190, a gesture input through the camera module 150, a switch/button input through the button 161 or the keypad 166, and a voice input through the microphone 162.

The object or item (functional item) may be displayed on the touch screen 190 of the portable terminal 100, and for example, may include at least one of an application, a menu, a document, a widget, a picture, a video, an e-mail, an SMS message, or an MIMS message. The object or functional item may be selected, executed, deleted, canceled, stored, or changed by the user input unit 168. One or more items may be assigned a functional meaning and may include a button, an icon (or shortcut icon), a thumbnail image, or a folder storing at least one object in a portable terminal. The item may be displayed in the form of an image or text.

The shortcut icon is an image displayed on the touch screen 190 of the portable terminal 100 for a quick launch of a voice communication, a contact address, or a menu provided in an application or the portable terminal 100. The corresponding application is executed if a command or a selection for executing the shortcut icon is input.

The controller 110 may detect a user input event such as a hovering event as the input unit 168 approaches the touch screen 190 or is located close to the touch screen 190.

If a user input event is generated for a preset item or according to a preset method, the controller 110 performs a preset program operation corresponding to the user input event.

The controller 110 may output a control signal to the input unit 168 or the vibration element 164. The control signal may include information on a vibration pattern, and the input unit 168 or the vibration element 164 generates vibrations according to the vibration pattern. The information on the vibration pattern may represent a vibration pattern itself and/or an identifier of a vibration pattern. The control signal may simply include only a request for generation of vibrations.

The portable terminal 100 may include at least one of the mobile communication module 121, the WLAN module 131, or the short-range communication module 132.

The mobile communication module 121 may implement a wireless connection between the portable terminal 100 and an external electronic device by using at least one or a plurality of antennas (not shown) under the control of the controller 110. The mobile communication module 121 transmits and receives wireless signals for a voice communication, a video communication, a short message (SMS) or a multimedia message (MMS) to and from a mobile phone (not shown) having a phone number input to the portable terminal 100, a smart phone (not shown), a tablet PC or another electronic device (not shown).

As described previously, the sub-communication module 130 may include at least one of the WLAN module 131 or the short-range communication module 132. For example, the sub-communication module 130 may include only the WLAN module 131, only the short-range communication module 132, or both the WLAN module 131 and the short-range communication module 132.

The WLAN module 131 may be connected to the Internet in an area where a Wireless Access Point (WAP) (not shown) is installed under the control of the controller 110. The wireless LAN module 131 may support a wireless LAN standard, such as any of the IEEE 802.11x series of standards developed by the Institute of Electrical and Electronics Engineers (IEEE). The short-range communication module 132 may perform wireless near-field communications between the portable terminal 100 and the external electronic device under the control of the controller 110. The near field communication method may include any of a Bluetooth communication, an Infrared Data Association (IrDA) communication, a WiFi-Direct communication, and a Near Field Communication (NFC).

The controller 110 may transmit a control signal according to a vibration pattern to the input unit 168 through the sub-communication module 130.

The broadcast communication module 141 may receive broadcasting signals (for example, a TV broadcasting signal, a radio broadcasting signal, or a data broadcasting signal) transmitted from a broadcasting station, as well as optional broadcast-added information (for example, an Electronic Program Guide (EPG), an Electronic Service Guide (ESG), or Radio Data System (RDS) text) under the control of the controller 110 through a broadcast communication antenna.

The multimedia module 140 may include an audio playback module 142 or a video playback module 143. The audio playback module 142 may reproduce a digital audio file (for example, a file whose extension is mp3, wma, ogg, or way) that is stored in or received from the storage unit 175 under the control of the controller 110. The video playback module 143 may reproduce a digital video file (for example, a file whose extension is mpeg, mpg, mp4, avi, mov, or mkv) that is stored in or received from the storage unit 175 under the control of the controller 110.

The multimedia module 140 may, but need not, be integrated with the controller 110.

The camera module 150 may include at least one of a first camera 151 and a second camera 152 for photographing a still image or a video under the control of the controller 110. The camera module 150 may include at least one of a barrel unit 155 for performing zooming in/out to photograph a subject, a motor 154 for controlling movements of the barrel unit 155, and a flash 153 for providing an auxiliary light source that may be used to photograph a subject. Illustratively, the first camera 151 may be disposed on a front surface of the portable terminal 100 and the second camera 152 may be disposed on a rear surface of the portable terminal 100.

The first and second cameras 151 and 152 may include various lens systems and image sensors. The first and second cameras 151 and 152 convert optical signals input (or captured) through the lens systems into electrical image signals and output the image signals to the controller 110. A user may photograph a video or a still image through the first and second cameras 151 and 152.

The I/O module 160 may, but need not, include at least one of the following: at least one button 161, at least one microphone 162, at least one speaker 163, at least one vibration element 164, the connector 165, the keypad 166, the earphone connecting jack 167, and the input unit 168. The I/O module 160 is not limited to any of the foregoing items, as, a cursor control such as a mouse, a track ball, a joystick or a cursor direction key may be used to implement the I/O module 160 to control a movement of a cursor on the touch screen 190.

The button 161 may be formed on a front surface, a side surface, or a rear surface of the housing (case) of the portable terminal 100, and may include at least one of a power/lock button, a volume button, a menu button, a home button, a back button, or a search button.

The microphone 162 receives a voice or a sound to generate an electrical signal under the control of the controller 110.

The speaker 163 may output a sound or acoustic vibrations corresponding to various signals or data (for example, wireless data, broadcast data, digital audio data, and digital video data) to the surrounding environment of the portable terminal 100 under the control of the controller 110. The speaker 163 may output one or more sounds. For example, a first beep or other audible annunciation corresponding to an incoming voice communication may be provided, as well as a second beep or audible annunciation corresponding to a voice communication connecting indication. The speaker 163 may also output and a voice of a counterpart user engaging in the now-connected voice communication. One or a plurality of speakers 163 may be provided at a location or locations of the housing of the portable terminal 100.

The vibration element 164 may convert an electrical signal into a mechanical vibration under the control of the controller 110. For example, when the portable terminal 100 in a vibration mode receives a voice or video call from another device (not shown), the vibration element 164 may be activated. One or a plurality of vibration elements 164 may be provided within the housing of the portable terminal 100. The vibration element 164 may be operated to correspond to a user input received or accepted through the touch screen 190.

The connector 165 may be used as an interface for connecting the portable terminal 100 to an external electronic device or a power source (not shown).

The controller 110 may transmit data stored in the storage unit 175 of the portable terminal 100 or receive data from an external electronic device through a cable connected to the connector 165. The portable terminal 100 may receive electric power from a power source through a wired cable connected to the connector 165, or a battery (not shown) provided within the portable terminal 100 may be charged by using a power source.

The keypad 166 may receive or accept a key input from the user to control the portable terminal 100. The keypad 166 includes a physical keypad (not shown) provided by the portable terminal 100 or a virtual keypad (not shown) provided by the touch screen 190. The physical keypad provided by the portable terminal 100 may be excluded.

An earphone (not shown) may be inserted into the earphone connecting jack 167 for connection to the portable terminal 100.

The input unit 168 may be inserted into the portable terminal 100 to be secured while the portable terminal 100 is not in use. The input unit 168 may be extracted or separated from the portable terminal 100 during use thereof. An attachment/detachment recognition switch 169 activated in response to mounting and attachment as well as detachment of the input unit 168 is provided in one area of the interior of the portable terminal 100 into which the input unit 168 is inserted. The attachment/detachment recognition switch 169 may output a first signal corresponding to mounting of the input unit 168 to the controller 110 and a second signal corresponding to separation of the input unit 168 and the controller 110. Alternatively or additionally, the switch may be placed into a first state corresponding to mounting of the input unit 168 to the controller 110, wherein the switch is placed into a second state corresponding to separation of the input unit 168 from the controller 110. The first state may, but need not, be a substantially open circuit and the second state may, but need not, be a substantially closed circuit. Alternatively, the first state may, but need not, be a substantially closed circuit and the second state may, but need not, be a substantially open circuit. The attachment/detachment recognition switch 169 may be configured to directly or indirectly contact the input unit 168 when the input unit 168 is mounted. Accordingly, the attachment/detachment recognition switch 169 may generate a signal corresponding to mounting or separation of the input unit 168 (that is, a signal for reporting mounting or separation of the input unit 168). The corresponding signal is output to the controller 110 based on a contact with the input unit 168. Alternatively, the attachment/detachment recognition switch 169 may change from a first state to a second state to thereby cause generation of a signal by the controller 110 or another circuit element.

The sensor module 170 includes at least one sensor for detecting a state of the portable terminal 100. For example, the sensor module 170 may include at least one of: a proximity sensor (not shown) for detecting an approach of a user to the portable terminal 100, a luminance sensor (not shown) for detecting an amount of light around the portable terminal 100, a motion sensor (not shown) for detecting an operation of the portable terminal 100 (for example, rotation of the portable terminal 100, and acceleration or vibration of the portable terminal 100), a geomagnetic sensor (not shown) for detecting a point of a compass of the portable terminal 100 by using a magnetic field of the earth, a gravity sensor (not shown) for detecting an operational direction of gravity, an altimeter (not shown) for measuring the pressure of the atmosphere to detect an altitude of the portable terminal 100, or a GPS module 157.

The GPS module 157 may receive electric waves from a plurality of GPS satellites (not shown) in orbit around the Earth, and may calculate a position of the portable terminal 100 by using arrival times for a plurality of RF signals transmitted by the GPS satellites and received by the portable terminal 100. The storage unit 175 may store signals or data input or output by any of the communication module 120, the multimedia module 140, the camera module 150, the input/output module 160, the sensor module 170 or the touch screen 190 under the control of the controller 110. The storage unit 175 may store a control program for control of the portable terminal 100 or the controller 110. The storage unit 175 may also store one or more applications.

As used herein, the term "storage unit" is used to refer to the storage unit 175, the ROM 112 in the control unit 110, the RAM 113, an arbitrary data storage unit such as a memory card (for example, an SD card or a memory stick) mounted to the portable terminal 100. The storage unit 175 may include a nonvolatile memory, a volatile memory, a Hard Disk Drive (HDD), a Solid State Drive (SSD), or any of various combinations thereof.

The storage unit 175 may store navigational information, video communications, one or more games, images used by applications for providing various functions such as an alarm application based on time, Graphical User Interfaces (GUIs) related to one or more user applications, user information, one or more documents, one or more databases, data related to a method of processing a touch input, background images (a menu screen, a standby screen, and the like), operating programs necessary for driving the portable terminal 100, or images photographed by the camera module 150.

The storage unit 175 is a non-transitory medium readable by a machine (for example, a computer). The term machine-readable medium may be defined as a non-transitory medium which provides data or instructions or both to a machine so that the machine can perform one or more specific functions. The storage unit 175 may include a nonvolatile medium, or a volatile medium, or a combination of a volatile medium and a non-volatile medium. All of the mediums should be concrete, tangible, and non-transitory so that the commands transferred by the mediums can be detected by a physical device that reads the commands into the machine.

The machine-readable medium includes at least one of a floppy disk, a flexible disk, a hard disk, a magnetic tape, a Compact disk Read Only Memory (CDROM), an optical disk, a punch card, a paper tape, a RANI, a Programmable Read Only Memory (PROM), an Erasable PROM (EPROM), and a flash-EPROM, but is not limited thereto.

The power supply 180 may supply electric power to one or a plurality of batteries disposed in the housing of the portable terminal 100 under the control of the controller 110. The one or plurality of batteries supply electric power to the portable terminal 100. The power supply 180 may supply the electric power input from an external power source to the portable terminal 100 through a wired cable connected to the connector 165. Alternatively or additionally, the power supply 180 may supply the electric power wirelessly input from an external power source to the portable terminal 100 through a wireless charging technology.

The portable terminal 100 may include at least one touch screen 190 for providing graphical user interfaces corresponding to any of various services (for example, voice communication, data transmission, listening to or viewing broadcasts, and photographing) to the user.

The touch screen 190 may output an analog signal corresponding to at least one user input applied to a graphical user interface displayed on the touch screen 190 and accepted by the touch screen controller 195.

The touch screen 190 may receive at least one user input applied by a human body (for example, a finger including a thumb) of the user, or applied by the input unit 168 (for example, a stylus pen or an electric pen).

The touch screen 190 may receive a continuous movement (that is, a drag input) of a single touch. The touch screen 190 may output an analog signal corresponding to a continuous movement of an input touch to the touch screen controller 195.

As discussed previously, the touch screen 190 may accept user input in the form of a contact of the touch screen 190 with a finger or the input unit 168. Alternatively or additionally, the touch screen 190 may accept user input in the form of a noncontact method (for example, the case of locating an applied user input unit within a specified minimum distance (for example, 1 cm) from the touch screen 190 by which the user input unit can be detected without any direct contact with the touch screen 190). The distance or interval by which the user input unit is recognized by the touch screen 190 may be selected, adjusted, or changed according to a desired performance parameter or structure of the portable terminal 100. In particular, the touch screen 190 may be configured such that values (for example, voltage values or current values which are analog values) detected by a direct touch event by a contact with the user input unit 168, and values detected an indirect touch event (that is, a hovering event) may be output differently or output in such a way so that the direct touch event and the indirect touch event may be distinguished from one another based upon the detected values.

The touch screen 190 may be realized, for example, using a resistive method, a capacitive method, an infrared method, an acoustic wave method, or any of various combinations thereof.

The touch screen 190 may include at least two touch screen panels by which a finger input and a stylus input can be detected, respectively, such that a first input applied by a portion of a human body such as a finger and a second input applied by a stylus such as the input unit 168 may be detected. The at least two touch screen panels may provide a plurality of different sensed output values to the touch screen controller 195. For example, the touch screen controller 195 may use the sensed output values received from the at least two touch screen panels in order to determine whether the touch screen 190 has accepted an input that was applied by a finger, versus an input that was applied by the input unit 168. Alternatively or additionally, the touch screen 190 may have a structure in which a capacitive touch panel and an Electromagnetic Resonance (EMR) type touch panel are combined. Since the touch screen 190 may include touch keys such as a menu button 161b (FIG. 2) and a back button 161c, a finger input applied to the touch screen 190 includes a touch input on the touch key.

The touch screen controller 195 converts an analog signal generated by the touch screen 190 in response to an accepted input into a digital signal and transmits the digital signal to the controller 110. The controller 110 may control the touch screen 190 by using a digital signal received from the touch screen controller 195. For example, the controller 110 may allow a shortcut icon (not shown) or an object displayed on the touch screen 190 to be selected or executed directly in response to a touch event or a hovering event. Further, the touch screen controller 195 may be integrated with the controller 110.

The touch screen controller 195 may detect or sense a value (for example, a current value) output through the touch screen 190 to identify a hovering interval or distance as well as an input location of the user, and may convert the identified distance value into a digital signal (for example, a Z coordinate) to provide the digital value to the controller 110. Further, the touch screen controller 195 may detect or sense a value (for example, a current value) output through the touch screen 190 so that the user input unit 168 can detect a pressure applied to the touch screen 190, and may convert the sensed pressure value into a digital signal to provide the digital signal to the controller 110.

Figure 2:
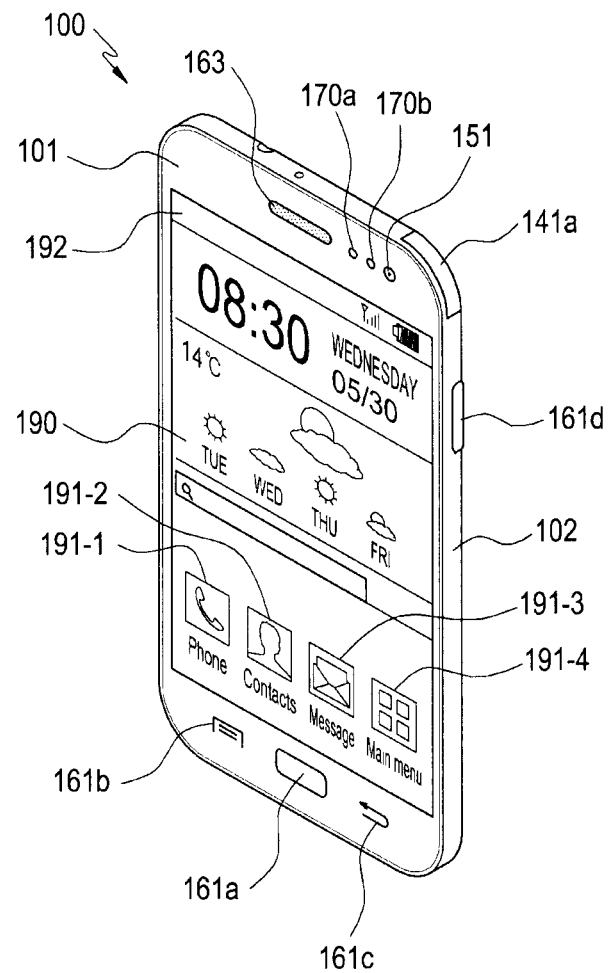
FIG. 2 is a front perspective view showing the portable terminal according to a set of exemplary embodiments of the present invention.
Figure 3:
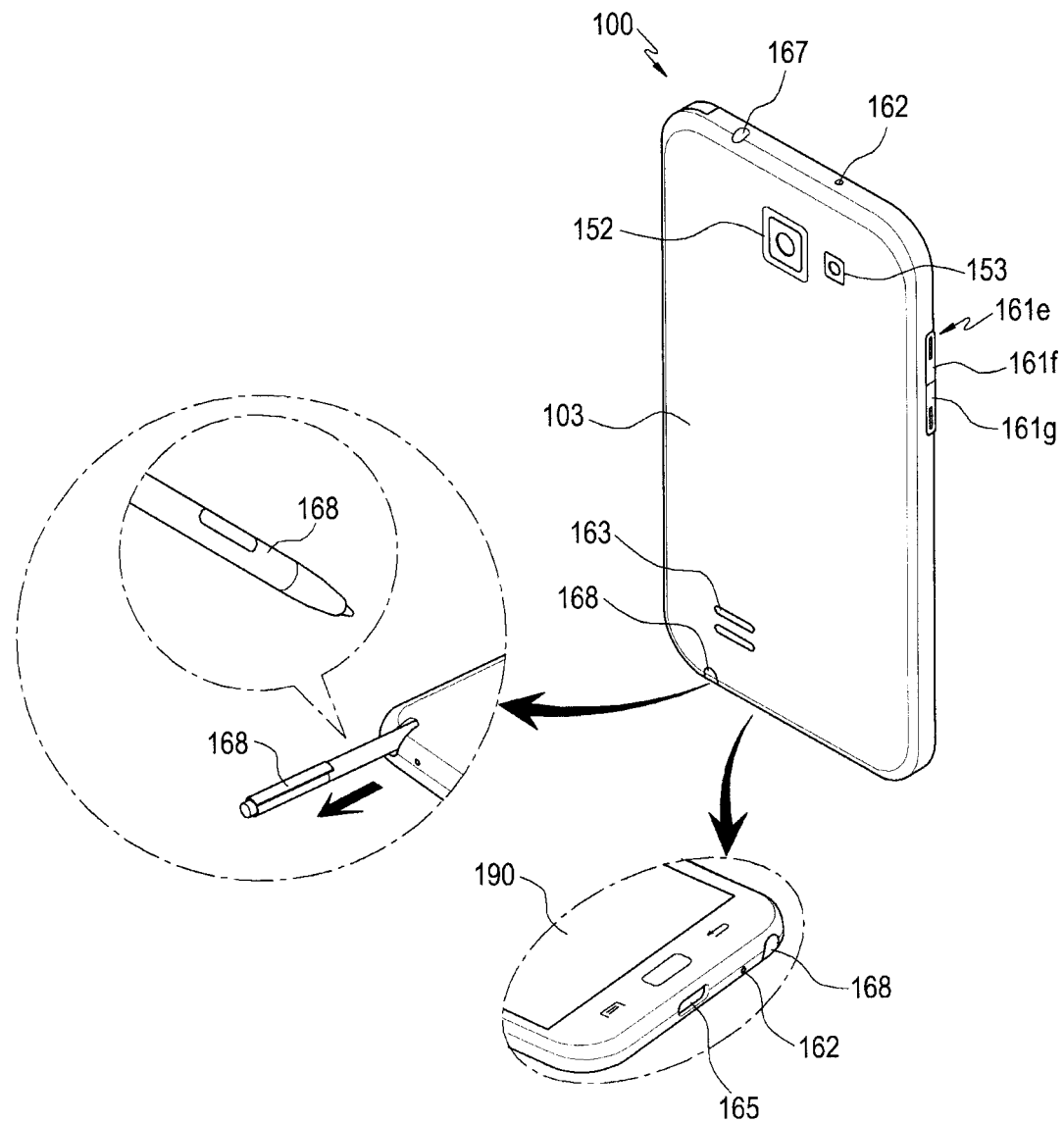
FIG. 3 is a rear perspective view showing the portable terminal according to a set of exemplary embodiments of the present invention.

FIG. 2 is a front perspective view showing the portable terminal according to a set of exemplary embodiments of the present invention. FIG. 3 is a rear perspective view showing the portable terminal according to a set of exemplary embodiments of the present invention.

Referring to FIGS. 2 and 3, the touch screen 190 is disposed at a center of a front surface 101 of the portable terminal 100. The touch screen 190 may, but need not, be formed to occupy almost the entire area of the front surface 101 of the portable terminal 100. FIG. 2 shows that a main home screen is displayed on the touch screen 190. The main home screen may be the first screen displayed on the touch screen 190 when the power of the portable terminal 100 is switched on. Further, when the portable terminal 100 has different home screens of several pages, the main home screen may be the first home screen of the home screens of several pages. Shortcut icons 191-1, 191-2, and 191-3 are used for executing frequently used applications. A main menu switching key 191-4 is provided. A current time, and current weather conditions may be displayed on the home screen. If a user selects the main menu switching key 191-4, a menu screen is displayed on the touch screen 190. Further, a status bar 192 for displaying statuses of the portable terminal 100 such as a battery charging state, an intensity of a received signal, and a current time may be formed, for example, at an upper end of the touch screen 190.

Touch keys such as a home button 161a, a menu button 161b, and a back button 161c, mechanical buttons or a combination thereof may be formed below the touch screen 190. Further, the touch keys may be formed as parts of the touch screen 190.

The home button 161a may be used to display the main home screen on the touch screen 190. For example, If the home button 161a is selected while another home screen or menu screen different from the main home screen is displayed on the touch screen 190, the main home screen may be displayed on the touch screen 190. If the home button 161a is selected while one or more applications are being executed on the touch screen 190, the main home screen shown in FIG. 2 may be displayed on the touch screen 190.

The home button 161*a* may be used to display recently used applications on the touch screen 190 or display a task manager.

The menu button 161*b* provides a connection menu that can be displayed on the touch screen 190. For purposes of illustration, the connection menu may include any of a widget adding menu, a background changing menu, a search menu, an edition menu, and an environment setting menu.

The back button 161*c* may be used to display a screen executed shortly before the currently executed screen, or may be used to end the most currently used application.

The first camera 151, the luminance sensor 170*a*, and the proximity sensor 170*b* may be disposed at a periphery of the front surface 101 of the portable terminal 100. The second camera 152, the flash 153, and the speaker 163 may be disposed on the rear surface 103 of the portable terminal 100.

For example, a power/lock button 161*d*, a volume button 161*e* having a volume up button 161*f* and a volume down button 161*g*, a terrestrial Advanced Television Systems Committee-Mobile/Handheld (ATSC-M/H) antenna 141*a* for receiving broadcasts, and one or a plurality of microphones 162 may be disposed on a side surface of the portable terminal 100. The ATSC-M/H antenna 141*a* may be fixed to or detachably mounted to the portable terminal 100. A connector 165 may be formed, for example, on a side surface of a lower end of the portable terminal 100. The connector 165 may have a plurality of electrodes and may be connected to an external device. An earphone connection jack 167 may be formed on a side surface of an upper end of the portable terminal 100. An earphone may be inserted into the earphone connection jack 167.

An input unit 168 may be mounted to a side surface of a lower end of the portable terminal 100. The input unit 168 may be inserted into and kept in the portable terminal 100 while the input unit 168 is not in use. The input unit 168 may be extracted and separated from the portable terminal 100 during use of the portable terminal 100.

Figure 4:
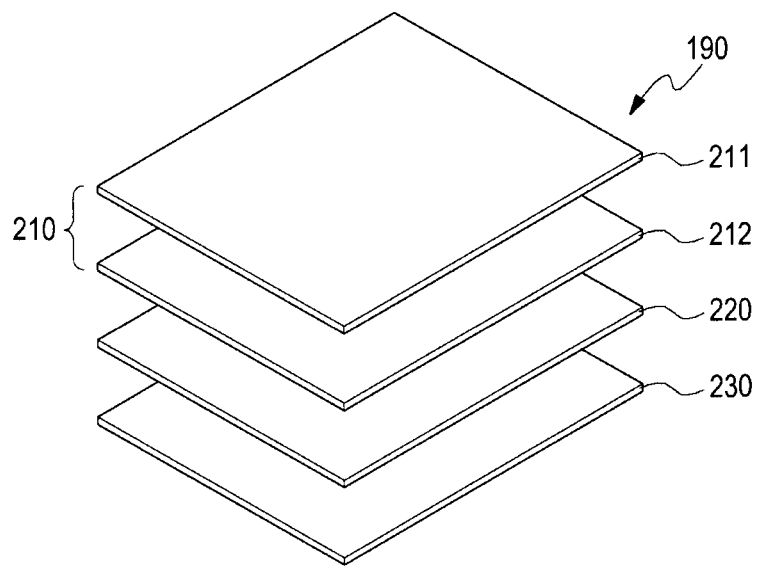
FIG. 4 is an exploded perspective view showing a touch screen of the portable terminal.

FIG. 4 is an exploded perspective view showing a main configuration of a touch screen. As shown, the touch screen 190 has a configuration in which a touch screen 210 for detecting a finger input, a display unit 220 for displaying a screen, and a digitizer 230 for detecting a pen input are attached to each other or are sequentially laminated to be partially spaced apart from each other from top to bottom. The touch panel 210 and the digitizer 230 may be referred to as a first and a second touch panel, respectively.

The display unit 220 includes a plurality of pixels and displays an image through the pixels. The display unit 220 may include one or more of a Liquid Crystal Display (LCD), an Organic Light Emitting Diode (OLED), or an LED.

The touch panel 210 includes a window 211 exposed to a front surface of the portable terminal 100, and a second sensor layer 212 for recognizing information (a location or an intensity) of a finger input. The second sensor layer 212 may be laminated on the window while being laminated on a separate substrate or may be directly laminated on the window 211. The touch panel 210 may be configured to provide touch keys such as a menu button 161*b* and a back button 161*c* disposed below a screen exposed to the user.

The upper surface of the window 211 forms at least a portion of the front surface of the touch screen 190 exposed to the outside. The window 211 may be formed of an insulating material which is substantially transparent to visible rays. An example of the insulating material may include a synthetic resin such as polyimide and polyethylene terephthalate or plastic.

A hard coating layer having a high hardness for preventing a scratch may be laminated on an upper surface of the window 211. The hard coating layer may, but need not, have both a hardness improving function and a glare preventing function. For example, the hard coating layer may be formed of a material obtained by adding a light scattering agent to a general hard coating agent.

The second sensor layer 212 includes a sensor for recognizing a location of a first input if a portion of a human body such as a finger contacts a surface of the window 211 (FIG. 4), and the second sensor layer 212 has preset patterns for this. The second sensor layer 212 may have various patterns such as a linear grid pattern or a diamond pattern, for example. The second sensor layer 212 may be laminated on a lower surface of the window 211, or a lower end (lower surface) of the second sensor layer 212 may be attached to an upper end (or upper surface) of the display unit 220 by using a transparent adhesive member.

Figure 5:
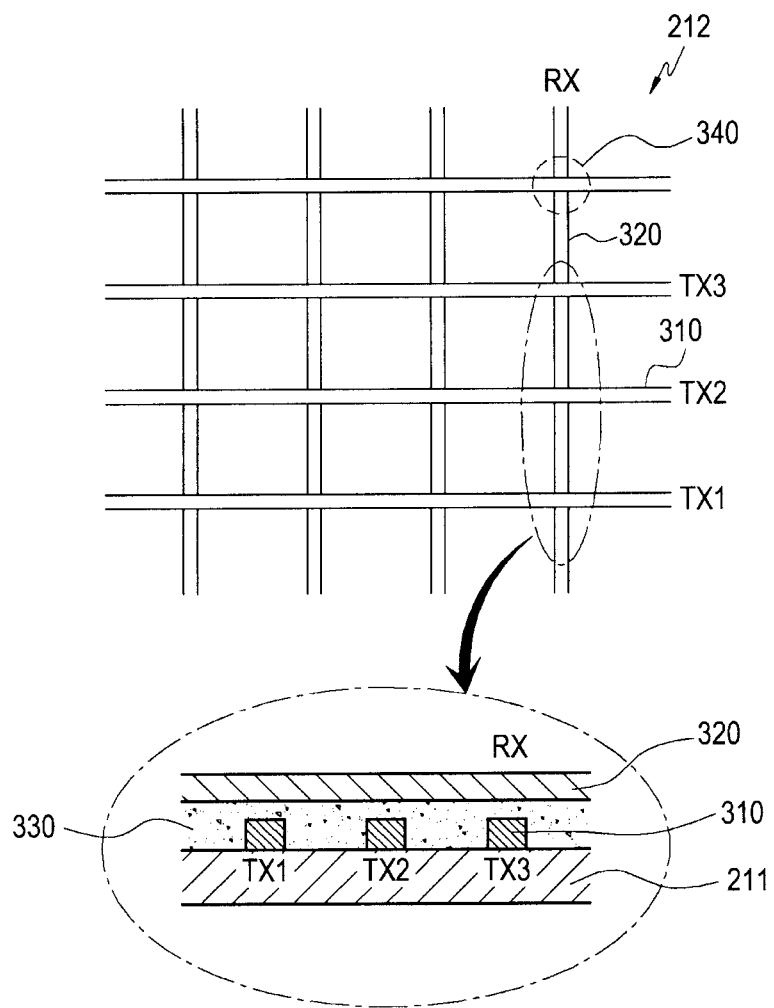
FIG. 5 is a plan view and a corresponding cross-sectional view exemplifying a pattern of a second sensor layer of the touch screen.

FIG. 5 is a plan view and a corresponding cross-sectional view illustrating a pattern of the second sensor layer. The second sensor layer 212 includes first electrode lines 310 and second electrode lines 320. The cross-sectional view displayed at a lower portion of FIG. 5 shows continuously disposed first electrode lines 310 TX1, TX2, ad TX3, and a second electrode line 320 RX.

The first electrode lines 310 extend along a first direction (for example, the x-axis or horizontal direction) and are disposed at the same interval or different intervals in a second direction (for example, the y-axis or vertical direction) crossing the first direction perpendicularly to the first direction.

The second electrode lines 320 extend along the second direction crossing the first direction perpendicularly to the first direction, and are disposed at the same interval or different intervals along the first direction.

In order to electrically insulate the first electrode lines 310 from the second electrode lines 320, an insulating layer 330 is disposed between the first electrode lines 310 and the second electrode lines 320. A suitable material for the insulating layer 330 may include, for example, an insulating dielectric material such as $SiO_2$.

The second sensor layer 212 may be formed of a conductive material which is substantially transparent to visible rays of light. An example of a suitable conductive material may include a carbon containing organic material such as Carbon Nano Tube (CNT) or graphene.

In order to perform a sensing function, a scan signal having a predetermined waveform is applied to the second sensor layer 212. If a portion of a human body such as a finger contacts a surface of the window 211, a detection signal whose waveform is changed due to an electrostatic capacity between the second sensor layer 212 and the portion of the human body is generated. The controller 110 analyzes the detection signal to recognize a contact and a contact location of the portion of the human body. For example, if the portion of the human body contacts the touch screen 190 (FIG. 2), an electrostatic capacity of a corresponding sensing point 340 (FIG. 5) increases. The controller 110 detects generation of a finger touch event based on a detection signal having a peak value above a threshold value (or a minimum value below a threshold value), or detects a finger input location. The threshold value may be empirically set as a value for distinguishing noise from a normal signal, and for example, may be set to a voltage of above 0 V or an electric capacity of above 0 pf. Meanwhile, a finger is an example of the portion of the human body, and any unit that can provide an electrostatic capacity between the second sensor layer 212 and the unit may be used.

In order to perform a sensor function, voltages (that is, scan signals) having predetermined waveforms are sequentially applied from the touch screen controller 195 (FIG. 1) to the first electrode lines 310 (FIG. 5), and the second electrode lines 320 outputs detection signals due to the scan signals to the touch screen controller 195. Points where the first and second electrode lines 310 and 320 cross each other become sensing points 340, and the sensing points 340 are disposed in a matrix structure in the illustrative example of FIG. 5. That is, a finger input location is determined by one of the locations of the sensing points 340. If the portion of the human body contacts a surface of the window 211, an entire electrostatic capacity of a corresponding sensing point 340 varies due to an electrostatic capacity between the second sensor layer 212 and the portion of the human body. Voltage waveforms of the detection signals output from the second electrode lines 320 vary due to the change in the electrostatic capacity. An input location and/or an input intensity of a finger input are recognized from the detection signals whose voltage waveforms have been modified by the applied finger input.

Figure 6:
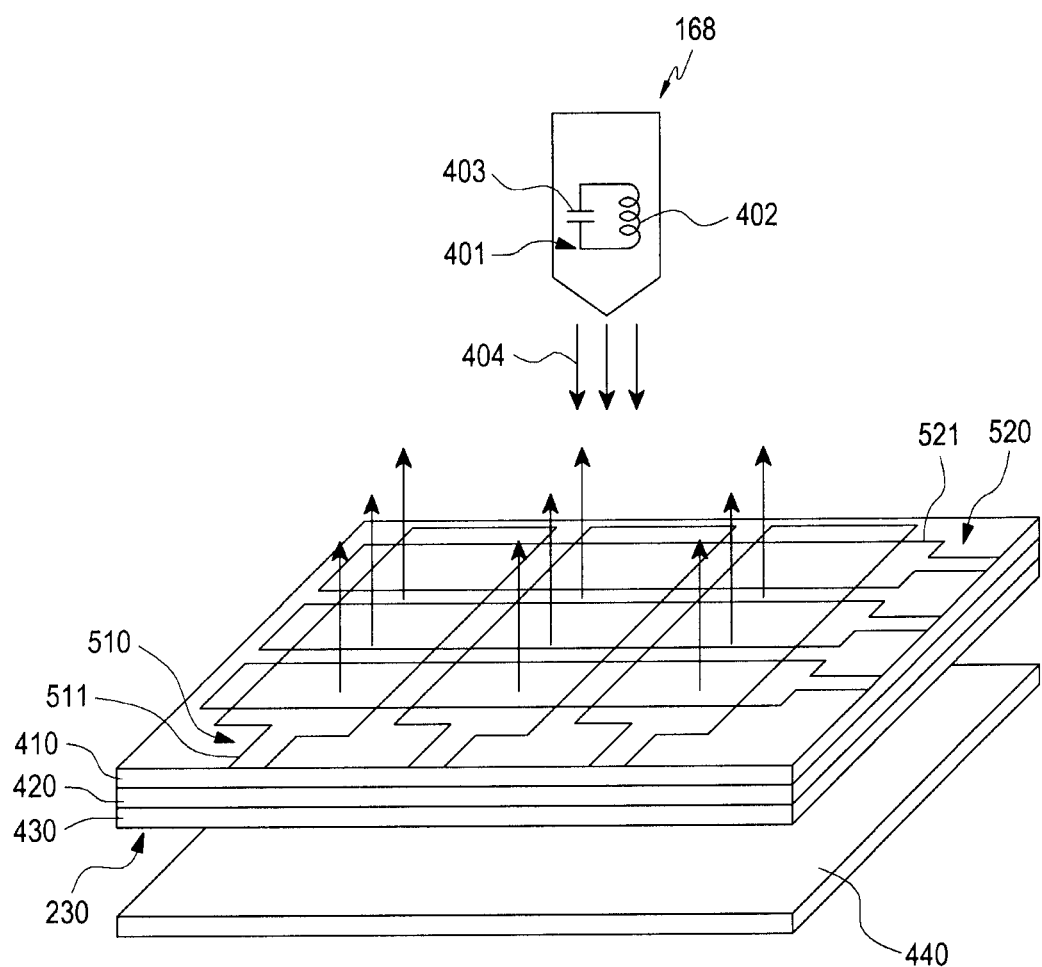
FIG. 6 is a perspective view illustrating the touch screen operating as a digitizer.

FIG. 6 is a perspective view illustrating the operation of the digitizer that was previously described in conjunction with FIG. 4.

The digitizer 230 may be an Electromagnetic (EM) touch panel, and includes a first sensor layer 410, a magnetic field shielding layer 420, and a conductive layer 430. The main board 440 disposed below the digitizer 230 may be a printed circuit board in which various circuits such as the controller 110, the communication module 120, the multimedia module 140, the input/output module 160, the sensor module 170, the storage unit 175, and the power supply 180 are mounted or connected to an upper surface or a lower surface thereof.

The first sensor layer 410 includes first and second loop parts 510 and 520, and is operated under the control of the touch screen controller 195, The first sensor layer 410 outputs detected signals to the touch screen controller 195. The first loop part 510 includes a plurality of first loops 511 and the second loop part 520 includes a plurality of second loops 521.

A magnetic field or electromagnetic signal 404 emitted by the input unit 168 may be absorbed by the loops 511 and 521, and accordingly, a portion of the digitizer 230 in closest proximity to the input unit 168 may be identified.

Further, the loops 511 and 521 may generate magnetic fields according to an input current, and the generated magnetic fields may be absorbed by the input unit 168. The input unit 168 may emit the absorbed magnetic fields again, and the magnetic fields emitted from the input unit 168 may be absorbed by the loops 511 and 521.

The first loop part 510 and the second loop part 520 may be disposed perpendicular to each other.

The first loop part 510 extends relatively long in the y-axis direction rather than in the x-axis direction, and accordingly is used to detect an x-axis coordinate of a pen input location.

The second loop part 520 extends relatively long in the x-axis direction rather than in the y-axis direction, and accordingly is used to detect a y-axis coordinate of a pen input location.

The first and second loops 511 and 521 detect an electromagnetic signal 404 having a predetermined frequency output from the input unit 168 in the form of an electrical signal. The first and second loops 511 and 521 output the detected electromagnetic signal 404 to the touch screen controller 195.

The input unit 168, when placed in proximity to the digitizer 230, generates an electromagnetic signal according to an operation of a resonant circuit 401 including a coil 402 and a capacitor 403, and outputs the electromagnetic signal.

The input unit 168 is one illustrative embodiment, as any unit capable of outputting an electromagnetic signal may be used.

The conductive layer 430 prevents the first sensor layer 410 and a circuit or a peripheral circuit of the main board 440 from interfering with each other due to stray magnetic fields, and is laminated on a lower surface of the electromagnetic field shielding layer 420. The conductive layer 430 may be laminated on an entire lower surface and an entire or portion of side surface of the digitizer 230. Then, the conductive layer 430 may surround at least an entire side surface of the first sensor layer 410. That is, the conductive layer 430 may have a box structure having an opened upper end like a general bracket. The conductive layer 430 prevents a magnetic field generated in a circuit or a peripheral circuit of the main board 440 from reaching the first sensor layer 410.

Figure 7:
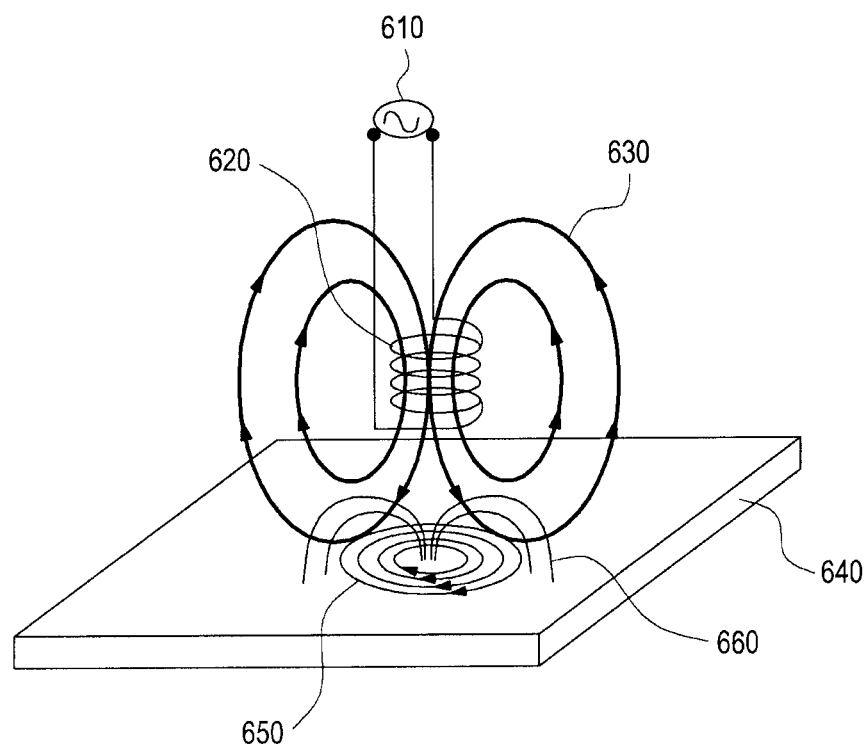
FIG. 7 and FIG. 8 are views illustrating principles of magnetic field shielding.
Figure 8:
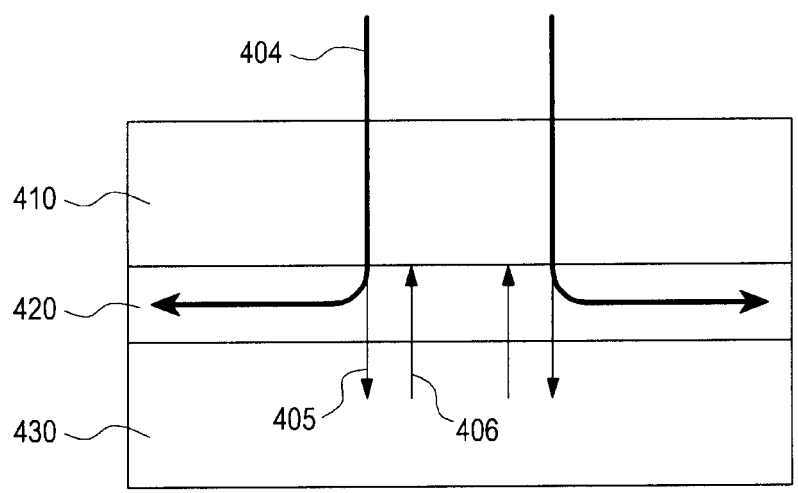

FIGS. 7 and 8 are views that illustrate the basic principles of magnetic field shielding.

Referring to FIG. 7, a coil 620 connected to an AC power source 610 generates a first magnetic field 630.

If a magnetic field is applied to the conductive layer 640, an eddy current 650 is generated. The eddy current 650 generates a second magnetic field 660 in an opposite direction to the applied first magnetic field 630, and accordingly, an intensity of the first magnetic field 630 is reduced by an offset interference by the second magnetic field 660.

For this reason, if an intensity of the magnetic field applied to the digitizer 230 is reduced, a maximum distance by which the digitizer 230 recognizes an input unit becomes shorter, which increases the possibility that the digitizer 230 will malfunction or not operate properly.

Referring to FIG. 8, the magnetic field shielding layer 420 is disposed between the first sensor layer 410 and the conductive layer 430. Almost all of the first magnetic field 404 having passed through the first sensor layer 410 flows through the magnetic field shielding layer 420 to significantly reduce an intensity of a residual magnetic field 405 having passed through the magnetic field shielding layer 420 and having reached the conductive layer 430. Thus, an intensity of the second magnetic field 406 generated by the residual magnetic field 405 is also significantly reduced. In this case, since the first magnetic field 405 fails to reach the conductive layer 430, an eddy current is not generated in the conductive layer 430, and the first magnetic field remains intact.

Unlike this example, the conductive layer 430 may be omitted, in which case since an offset interference may be generated by the eddy current due to a conductive element located around the digitizer 230, the magnetic field shielding layer 420 is used to restrain the offset interference.

Figure 9:
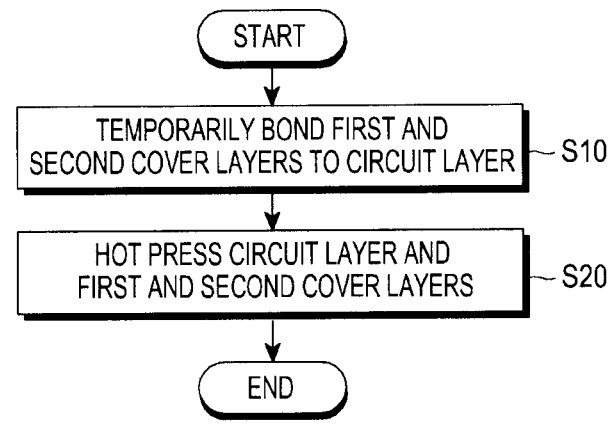
FIG. 9 is a flowchart showing a method of manufacturing a digitizer according to a first set of exemplary embodiments of the present invention.

FIG. 9 is a flowchart showing a method of manufacturing a digitizer according to a first set of embodiments of the present invention, and FIG. 10 is a view for explaining the method of manufacturing a digitizer.

Figures 10A, 10B:
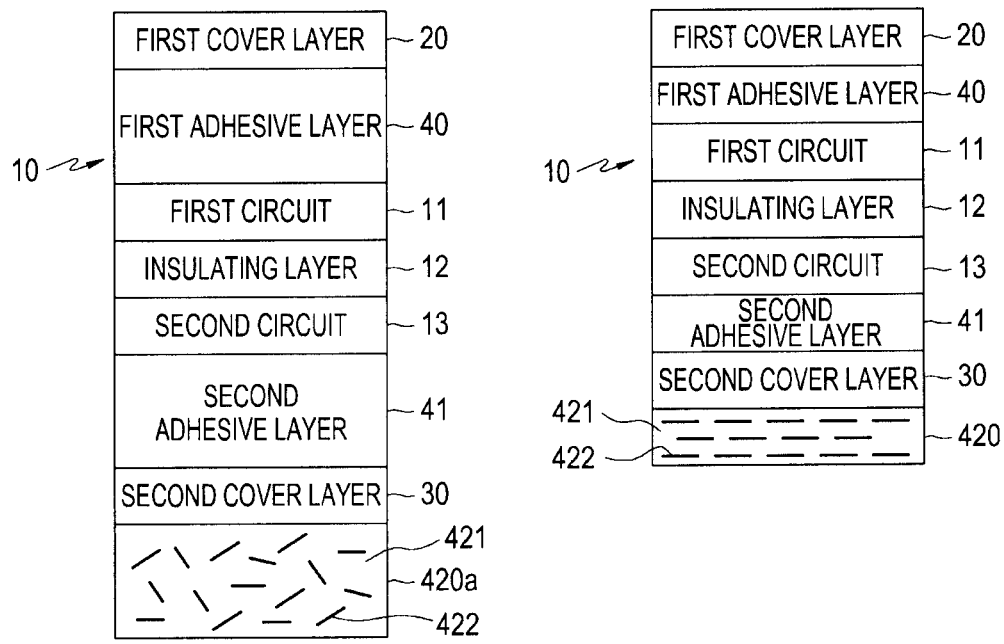
FIG. 10A and FIG. 10B is a diagrammatic representation illustrating a method of manufacturing a digitizer according to the first set of exemplary embodiments of the present invention.

The method of manufacturing a digitizer includes steps S10 to S20. FIG. 10A shows an arrangement of layers which correspond to step S10 of FIG. 9, and FIG. 10B shows this arrangement of layers upon performance of step S20 of FIG. 9.

Step S110 is a step of temporarily bonding first and second cover layers 20 and 30 to a circuit layer 10. The first and second cover layers 20 and 30 are temporarily bonded to the circuit layer 10 by using first and second adhesive layers 40 and 41. That is, the temporary bonding step is a step of temporarily bonding the first and second cover layers 20 and 30 to the circuit layer 10 before hot pressing. The circuit layer 10 includes an insulating layer 12. First and second conductive circuits 11 and 13, laminated on opposite surfaces of the insulating layer 12, constitute loop parts 510, 520 (FIG. 6). The first and second circuits 11 and 13 (FIGS. 10A and 10B) have preset conductive circuit patterns, respectively. Further, in the illustrated layered structure, any of the adjacent layers may be expressed to be laminated on or attached to each other.

The circuit layer 10 may be formed by preparing a Copper Clad Laminate (CCL) including an insulating layer 12 of a Polyimide (PI) material, a first conductive layer of a copper material laminated on a first surface of the insulating layer 12, and a second conductive layer of a copper material laminated on a second surface of the insulating layer located on an opposite side of the first surface, and etching the first and second conductive layers by conventional photolithography such that the first and second conductive layers have patterns of the loop parts 510, 520 (FIG. 6). The photo-etched first and second conductive layers form first and second circuits 11 and 13 (FIGS. 10A and 10B).

The first cover layer 20 may be formed of a polyimide material, and may be bonded to a surface of the first circuit 11 by using a first adhesive layer 40 such as a pressure sensitive adhesive or a thermosetting adhesive.

The second cover layer 30 may be formed of a polyimide material, and may be bonded to a surface of the second circuit 13 by using a second adhesive layer 41 such as a PSA or a thermosetting adhesive.

The magnetic field shielding layer 420*a* may be coated on a surface of the second cover layer 30.

The magnetic field shielding layer 420*a* may have a structure in which magnetic powder 422 in the form of thin plate-shaped flakes is dispersed disorderly (or at random) in an insulating and/or adhesive resin 421. That is, the magnetic field shielding layer 420*a* may contain disoriented magnetic powder 422.

For example, the magnetic field shielding layer 420*a* may be formed by transforming magnetic powder such as one or more of a ferrite, Molypermalloy Powder (MPP), an Fe—Si—Al series material (Sandust), or an Ni—Fe series material (Highflux) into flakes, adding and dispersing the transformed magnetic powder 422 into an insulating and/or adhesive resin (or adhesive) 421, and coating the resin 421 in which the magnetic powder 422 is dispersed on a surface of the second cover layer 30. The resin 421 in which the magnetic powder 422 is coated on the second cover layer 30 forms the magnetic field shielding layer 420*a*.

Step S20 is a step of hot pressing the circuit layer 10 and the first and second cover layers 20 and 30. The circuit layer 10 and the first and second cover layers 20 and 30 may be hot pressed by using a hot press apparatus. The hot pressing refers to applying a pressure at a high temperature, for example, a temperature in the approximate range of 120 to 280° C.

The thicknesses of the magnetic field shielding layer 420*a* and the adhesive layers 40 and 41 are reduced through the hot pressing process. The magnetic powder 422 that was dispersed disorderly or randomly is now arranged (that is, oriented) in a predetermined direction in the magnetic field shielding layer 420 through the hot pressing process. The magnetic field shielding characteristics of the oriented magnetic field shielding layer 420 are significantly improved relative to the randomly or disorderly orientation of the magnetic powder 422. The magnetic field shielding layer 420 having undergone the hot pressing process may have a permeability of 100 H/m to 200 H/m in a DC band, and may have a permeability of 100 H/m to 150 H/m in a band of 500 KHz (531.25 KHz, 562.5 KHz, and 593.75 KHz). The magnetic field shielding layer 420 passes a geomagnetic field therethrough and does not influence an operation of a geomagnetic sensor. For example, the magnetic field shielding layer 420 may have a thickness of 50 μm to 100 μm.

The circuit layer 10 and the first and second cover layers 20 and 30 may constitute the first sensor layer 410.

Figure 11:
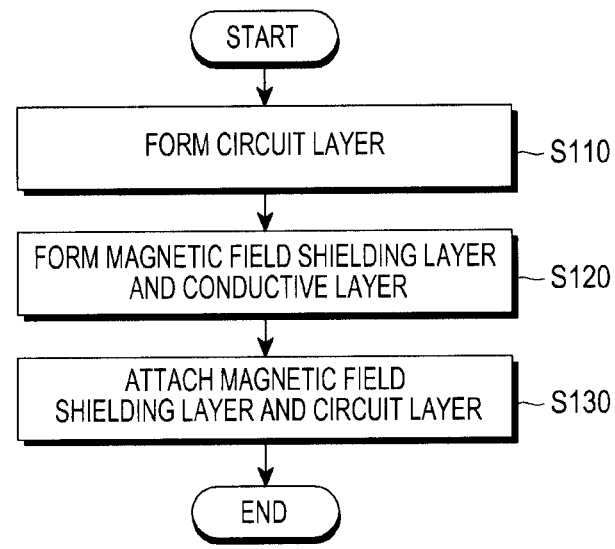
FIG. 11 is a flowchart showing a method of manufacturing a digitizer according to a second set of exemplary embodiments of the present invention.

FIG. 11 is a flowchart showing a method of manufacturing a digitizer according to a second set of embodiments of the present invention. FIGS. 12 to 14 are views for explaining the method of manufacturing a digitizer according to the second set of embodiments of the present invention.

The method of manufacturing a digitizer includes steps S110 to S130.

Step S110 is a step of forming a circuit layer 710. The circuit layer 710 including first and second circuits 711 and 713, and a first cover layer 720 laminated on a first surface of the circuit layer 710, are formed. Hereinafter, first and second surfaces of the layers are located on opposite sides of the layers. The circuit layer 710 has preset conductive circuit patterns such as loop parts 510, 520 (FIG. 6). In the layered structure of FIGS. 12A and 12B, adjacent layers may be expressed to be directly laminated on or attached to each other.

Figures 12A, 12B:
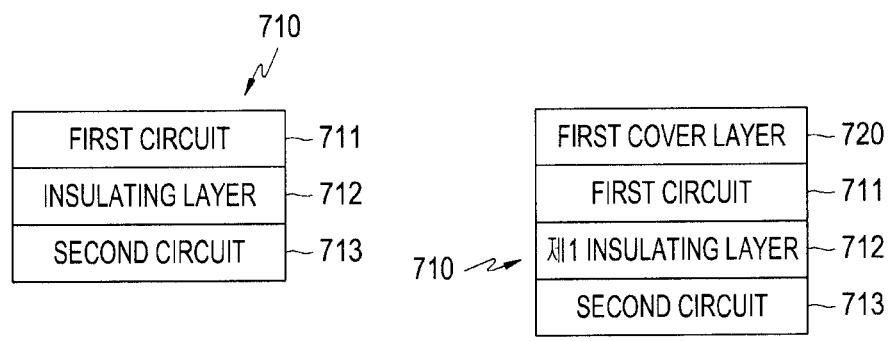

Referring to FIG. 12A, the circuit layer 710 includes an insulating layer 712, a conductive first circuit 711 laminated on a first surface of the insulating layer 712, and a conductive second circuit 713 laminated on a second surface of the insulating layer 712 located on an opposite side of the first surface.

Referring to FIG. 12B, an insulating first cover layer 720 may be laminated on a surface of the first circuit 711.

For example, the first circuit 711 and the first cover layer 720 may be attached to each other by disposing an adhesive layer such as one or more of a Pressure Sensitive Adhesive (PSA), an adhesive sheet, a bonding sheet, or a thermosetting adhesive between the first circuit 711 and the first cover layer 720 of a polyimide material, and pressing the first circuit 711 and the first cover layer 720. The first circuit 711 and the first cover layer 720 may be hot pressed by using the PSA or the thermosetting adhesive and a hot press apparatus. The first circuit 711 and the first cover layer 720 may be attached to each other through a UV-curable adhesive irradiated with UV rays.

Step 120 is a step of forming a magnetic field shielding layer 420*a* and a conductive layer 430. The magnetic field shielding layer 420*a* is laminated on a second surface of an insulating second cover layer 730 and a conductive layer 430 is laminated on a surface of the magnetic field shielding layer 420*a*. Referring to FIG. 13A, the magnetic field shielding layer 420*a* has a structure in which magnetic powder 422 in the form of thin plate-shaped flakes is dispersed disorderly (or at random) in an insulating and/or adhesive resin 421. That is, the magnetic field shielding layer 420*a* contains disoriented magnetic powder 422.

Referring to FIG. 13B, while the magnetic field shielding layer 420*a* is not dried, an aluminum or magnesium conductive layer 430 in the form of a film is attached to a surface of the magnetic field shielding layer 420*a*.

Note that, in contrast to the example of FIG. 13B, the conductive layer 430 may, but need not, be attached to a surface of the magnetic field shielding layer 420a by using an adhesive. Then, the conductive layer 430 may be attached to a surface of the magnetic field shielding layer 420a by using an adhesive such as a PSA or a thermosetting adhesive so that the conductive layer 430 may be hot pressed during the hot pressing of the magnetic field shielding layer 420a.

Step S130 is a step of attaching the magnetic field shielding layer 420a and the circuit layer 710. The magnetic field shielding layer 420a and the circuit layer 710 may be hot pressed by using the PSA or the thermosetting adhesive and a hot press apparatus.

Referring to FIG. 14A, the magnetic field shielding layer 420a and the circuit layer 710 may be arranged while the adhesive layer 740 such as a PSA or a thermosetting adhesive is interposed therebetween. That is, a second surface of the second circuit 713 and a first surface of the second cover layer 730 are temporarily attached by using the adhesive layer 740.

Referring to FIGS. 14A and 14B, the magnetic field shielding layer 420a and the circuit layer 710 are hot pressed by using a hot press apparatus. The thicknesses of the magnetic field shielding layer 420a and the bonding layer 740 are reduced through the hot pressing process. Prior to performance of the hot pressing process, the magnetic powder 422 has a randomly or disorderly dispersed magnetic orientation. The thermal pressing process arranges or orients the magnetic powder 422 in a predetermined direction in the magnetic field shielding layer 420.

The first and second cover layers 720 and 730, the first and second circuits 711 and 713, and the insulating layer 712 may constitute the first sensor layer 410.

In contrast to the example of FIGS. 14A and 14B, after the magnetic field shielding layer 420 is hot pressed, the conductive layer 430 may be attached to the magnetic field shielding layer 420 by using an adhesive. The conductive layer 430 may be coated on the magnetic field shielding layer 420 through a deposition process.

The present invention provides a digitizer which reduces or eliminates interference caused by stray electromagnetic fields from external circuit components or conductors. The digitizer has a thin structure, and is simple to manufacture.

In more detail, according to a set of illustrative embodiments of the present invention, the need to perform a separate process or a special step of orienting magnetic powder may be eliminated. The magnetic powder is automatically oriented when a magnetic field shielding layer and a circuit layer are hot pressed. A separate cutting and attaching process for a cover layer and the magnetic field shielding layer can be excluded. In addition, a digitizer manufacturing process may be automated and simplified. The digitizer may be designed to have a thin structure, low cost, and high performance by directly coating the magnetic field shielding layer on the cover layer and excluding a separate bonding film for attachment of the magnetic field shielding layer.

Although the exemplary embodiments of the present invention have been described in detail with reference to specific examples, various modification can be made without departing from the scope of the present invention. Thus, the scope of the present invention is not determined by the above-described embodiments and should be determined by the claims and their equivalents.

What is claimed is:

1. An electronic device comprising:
    a magnetic field sensor configured to detect first input based on a magnetic field;
    a display disposed on a top of the magnetic field sensor, wherein the display is configured to display a screen; and
    a capacitive sensor layer disposed on a top of the display, wherein the capacitive sensor layer is configured to detect a second input based on a change in a capacitance,
    wherein the magnetic field sensor comprises:
    a first conductive layers a magnetic field shielding layer formed between the first conductive layer and a first cover layer, wherein the magnetic field shielding layer is configured to reduce an intensity of a magnetic field reaching the first conductive layer, and the first cover layer in contact with the magnetic field shielding layer, and
    wherein the magnetic field shielding layer is formed by hot pressing the first cover layer onto the first conductive layer while a mixture of an adhesive resin and a disoriented magnetic powder is disposed between the first cover layer and the first conductive layer, wherein the hot pressing causes the disoriented magnetic powder to be oriented and attaches the first cover layer to the first conductive layer, and wherein the magnetic field shielding layer is the mixture including oriented magnetic powder.

2. The electronic device of claim 1, wherein the magnetic field further comprises a circuit layer disposed on a top of the first cover layer, wherein the circuit layer comprises:
    an insulating layer; and
    first and second circuit patterns disposed on opposite sides of the insulating layer.

3. The electronic device of claim 2, wherein the insulating layer comprises polyimide (PI).

4. The electronic device of claim 2, wherein the first and second circuit patterns are formed by etching a second conductive layer and a third conductive layer disposed on opposite sides of the insulating layer, respectively.

5. The electronic device of claim 4, wherein the second conductive layer and the third conductive layer comprise copper.

6. The electronic device of claim 1, wherein the first conductive layer is a magnesium bracket.

7. The electronic device of claim 1, wherein the magnetic field sensor further comprises a fourth conductive layer disposed between the first conductive layer and the magnetic field shielding layer.

8. The electronic device of claim 7, wherein the fourth conductive layer is a film of aluminum or magnesium.

9. The electronic device of claim 2, wherein the magnetic field sensor further comprises a first adhesive layer disposed between the first cover layer and the circuit layer, wherein the first adhesive layer comprises a pressure sensitive adhesive or a thermosetting adhesive.

10. The electronic device of claim 2, wherein the magnetic field sensor further comprises a second cover layer disposed on a top of the circuit layer on an opposite side to a side facing towards the first cover layer.

11. The electronic device of claim 10, wherein the magnetic field sensor further comprises a second adhesive layer disposed between the second cover layer and the circuit layer.

* * * * *